(Model.)
C. L. SPENCER.
COMBINATION FISH HOOK.
No. 315,967. Patented Apr. 14, 1885.
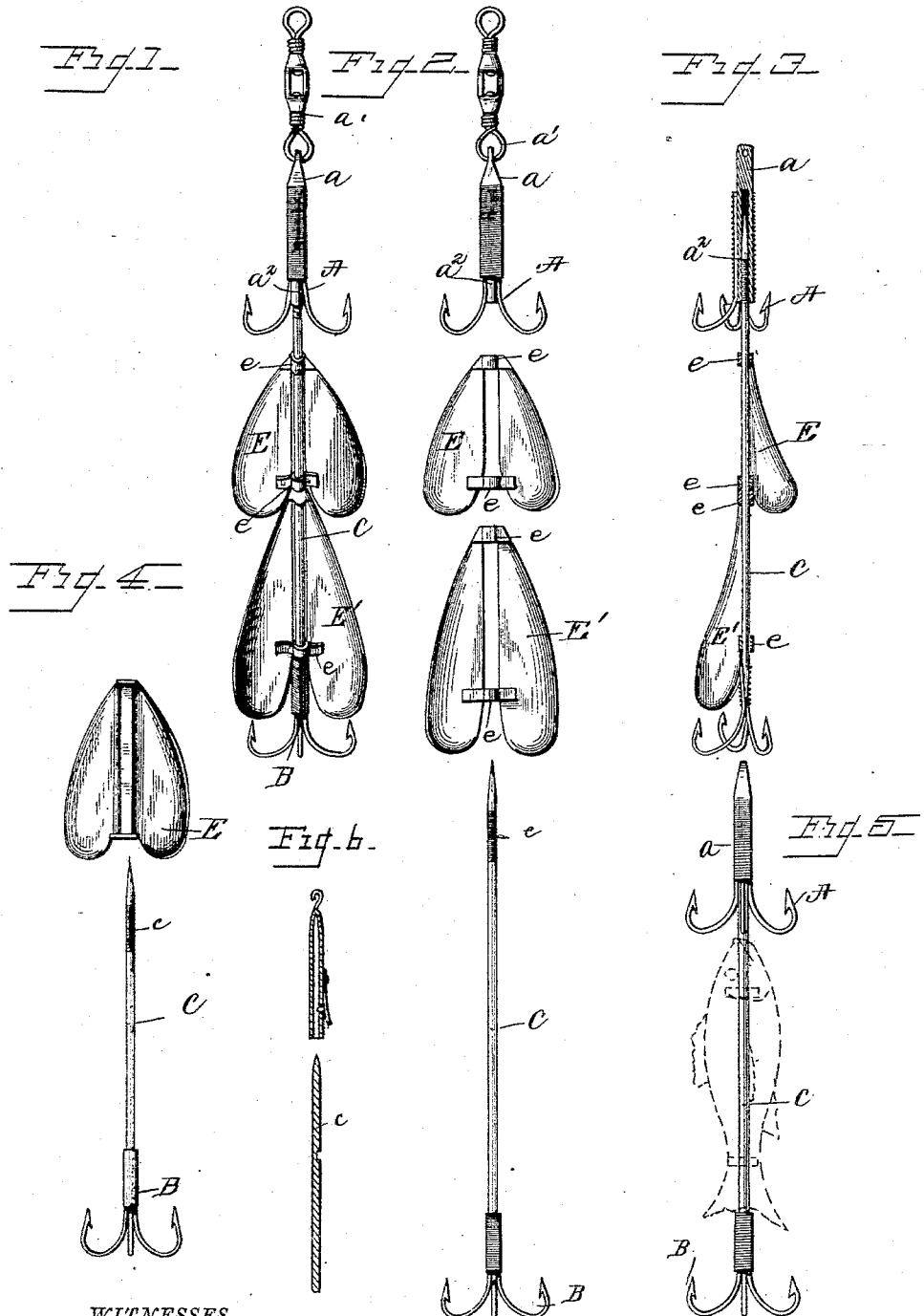
WITNESSES
F. L. Ousand
W. H. Garner
INVENTOR
Clare L. Spencer
by
L. Deane
his Attorney

UNITED STATES PATENT OFFICE.

CLARE L. SPENCER, OF GENEVA, NEW YORK, ASSIGNOR TO DOMINICK E. DEMPSEY, OF SAME PLACE.

COMBINATION FISH-HOOK.

SPECIFICATION forming part of Letters Patent No. 315,967, dated April 14, 1885.

Application filed July 24, 1884. (Model.)

*To all whom it may concern:*

Be it known that I, CLARE L. SPENCER, a citizen of the United States, residing at Geneva, in the county of Ontario and State of New York, have invented certain new and useful Improvements in Combination Fish-Hooks, of which the following is a specification, reference being had therein to the accompanying drawings.

Figure 1 is a front elevation with two spinners on the needle, showing the parts ready for use. Fig. 2 is a front elevation showing the parts separated. Fig. 3 is a vertical central section of Fig. 1. Fig. 4 shows in elevation the needle adapted for a single spinner. Fig. 5 shows the hooks without spinner, and adapted for use with or without live bait. Fig. 6 shows a modification of method of securing the lower gang of hooks to the upper.

This invention relates to improvements in fishing-hooks; and the novelty consists in such construction of the several parts that there is produced a combination-hook adapted for use in troll-fishing either with spinner or bait, or by removing these as a gang-hook for still fishing, all as will be more fully set out and explained hereinafter.

In the accompanying drawings, A denotes the upper gang-hook in and to which the several hooks are attached in any usual way to the stem $a$, which at its upper end has swivel-connection for attachment to the line. The hooks of the lower gang-hook, B, are attached in any desired way or manner to the lower end of the needle C. This needle is of any suitable length to keep the two gang-hooks at desired distance apart. Its upper end is sharp-pointed and screw-threaded at $c$. This end of the needle is adapted for insertion in a socket, $a^2$, in the stem $a$, wherein it will be securely held; but while I prefer this construction I may have the upper end of the needle slotted, and may use a spring-catch to engage in said slot, as shown in Fig. 6. My intention is to so fit the needle for application to the upper gang that it may be easily and securely inserted, and be capable of easy detachment when necessary to separate the parts; but these details of construction are only instances of many similar that I may use for providing an easy method of attachment of the needle to or its release from the socket $a^2$ of stem $a$.

The spinner E has preferably a twist or screw shape, and is provided with loops or eyes $e$, through which the needle may be passed when it is desired to use the spinner. The second spinner, E', on this needle, as in Figs. 1, 2, and 3, is made and applied in the same way, except that the twist is opposite to that of the first spinner. By this construction the two spinners will revolve in opposite directions when used in the water. I design to use one or two spinners, as desired. To this end I make the needle longer or shorter, so as to accommodate one or two spinners, or I may use several spinners on one needle; but when it is desired to use live or other bait, instead of the spinner or spinners, the latter is removed and the needle is thrust through the live or other bait, and then secured in place in the stem of the other gang-hook, or the device may be used without either spinner or bait on the needle for still fishing, and in the ordinary way hooks are employed in fishing.

Having now described my invention, what I consider new, and desire to secure by Letters Patent, is—

1. In combination with a fishing-hook, a removable needle for fixing live or other bait upon, substantially as described.

2. The combination of gang-hooks A, having a hollow stem, with needle C, having a screw-threaded end, and gang-hooks B, substantially as described.

3. A combination fishing-hook consisting of two gangs—viz., an upper gang, and a detachable bar carrying a lower gang—substantially as described.

4. The combination of the gang-hooks A and B, and a needle, C, adapted to receive spinners or live bait interchangeably, substantially as described.

5. In a combination trolling and still-water fish-hook, the combination of a lower gang, B, a needle, C, an upper gang, A, secured to said needle by a detachable fastening, and one or more spinners constructed and applied on the needle, substantially as described.

In testimony whereof I affix my signature in presence of two witnesses.

CLARE L. SPENCER.

Witnesses:
   E. J. ROGERS,
   GEORGE ROOT.